J. S. BAKER.
BALLOT.
APPLICATION FILED JULY 26, 1920.
1,410,984.  Patented Mar. 28, 1922.

UNITED STATES PATENT OFFICE.

JOHN S. BAKER, OF LOS ANGELES, CALIFORNIA.

BALLOT.

1,410,984.

Specification of Letters Patent.   Patented Mar. 28, 1922.

Application filed July 26, 1920. Serial No. 399,130.

*To all whom it may concern:*

Be it known that I, JOHN S. BAKER, a citizen of the United States, residing at Los Angeles, in the county of Los Angeles and State of California, have invented certain new and useful Improvements in Ballots; and I hereby declare that the following is a full, clear, and exact description thereof, reference being had to the accompanying drawings, which form part of this specification.

This invention relates to means for balloting and voting without the use of voting machines. The invention provides a novel ballot which the average voter can use as readily as he can the present marking system and with greater accuracy, as he does not have to handle any machinery for registering his vote.

The invention resides in a novel ballot which has holes in such manner that the voter can readily enlarge the holes opposite the name of each candidate for whom he desires to vote, so that such ballots can be thereafter easily counted by a suitable machine.

In general appearance the ballot is similar to the ordinary paper ballot, and the novel feature of the invention is a ballot so formed that suitably sized and properly located holes must be made therein before it can be voted, and the voter can make such holes as readily as he could mark the ballot with a pencil, without having to use any machine or apparatus for locating the holes.

My invention provides an ordinary looking ballot which is provided with guiding holes and when the voter desires to vote for any candidate he simply enlarges the related hole into a hole of such size and so exactly positioned in the ballot that when such ballot is run through a proper counting machine its detectors will find such hole and accurately count the votes registered on the ballot, and improper counting or registration will be prevented.

My invention does not require any change in the present system of voting. The voter as usual goes to the booth and is given an ordinary looking ballot, made of cardboard, or heavier paper than is usually employed, and instead of merely stamping or marking a cross on the ballot opposite the name of the candidate for whom he wishes to vote, he simply enlarges the holes in the ballot opposite the name of the candidates for whom he votes into holes of proper size with a lead pencil, or pointed stick or the like.

In the accompanying drawings I have conventionally illustrated ballots embodying the invention, and will explain the same with reference to said drawings, and summarize in the claims the essential novel features for which protection is desired.

In said drawings:

Fig. 1 illustrates part of a ballot embodying the invention.

Fig. 2 is a detail view of a slight modification.

Fig. 3 is a detail view of another modification.

Figs. 4 and 5 are side and end views of a combination hand punch and stamp which may be used in connection with the ballot.

The ballot is preferably made either of heavy paper or of cardboard, and of about the size commonly employed, and may have the same superficial arrangement of printed matter as the common ballots usually employed in voting by the socalled Australian ballot system.

On such ballots the candidates for "State", "Judicial", "Congress", etc. are usually arranged in parallel columns (A, B, G) and spaces are provided in each column for the names of the candidates; such spaces being indicated at C; and adjacent each space in the preferred form of ballot is a marking space or box, indicated at *a*.

In the preferred form of ballot (Figs. 1, 2 and 3) in each box *a* is a small hole *b*, and when the voter wishes to register a vote for any candidate he enlarges this hole by forcing a pencil or other instrument through the ballot, forming a hole *c* therein as indicated; the point of the pencil or instrument being guided by the small hole previously made in the ballot at the proper location, so that the hole when completed has its center at what was the center of the small hole,—and the small hole has been enlarged.

The small holes *b* may be enlarged to holes of suitable size to cause the registration of the votes by the counting machine by any suitable means. Preferably I provide a tool or punch such as shown in Figs. 4 and 5; such tool having a handle 1 and a tapered member 2 which will readily engage a small hole *b* and then enlarge same to a hole of the size desired as the member is forced through the ballot. Such a tool will enable the voter to regularly and uniformly enlarge the small holes in the ballot.

In the ballot indicated in Fig. 1, the names of the candidates are printed or written in the spaces C and if the voter desires to vote for another candidate he can write the name of the candidate in the blank space C, and the mere writing a name in such space will be understood to cancel the name of the candidate printed in such space and the ballot will be so counted; that is, the written name cancels the printed name in any space. In counting the ballots by machine the machine would count for the printed one, and in the final count it would be necessary to deduct from the names of the printed candidates the number of ballots in which the names are written in, and therefore in order to indicate in the counting machine that the ballot has been changed by names written in by the voter the ballot is provided with a small hole f, which is shown in Fig. 1 as located adjacent the top of the ballot, but may be located at any other conspicuous place; and when a voter writes in a name he must enlarge this small hole, so that when such ballot is registered on the ballot counting machine the latter will show that it was altered.

The hole f may be located in any conspicuous place on the ballot, and the ballot should bear on its face suitable indicia calling attention to such hole. In the example shown the voter's attention is called to this hole by printing on the ballot adjacent this hole alleging "if you write in names, punch this hole." This hole f may be placed at any desired location on the ballot and such hole governs irregular and scattered votes only, i. e. written in names, and has no reference to the actual vote counting; and simply provides the ballot with a properly indicated and located place to be punched by the voter when he writes in a new name and thereby alters the ballot so that it should have individual attention.

A further advantage of writing the substitute candidate's name in the same box or space as the printed candidate's name is that it condenses the ballot and eliminates the necessity of additional blank spaces and thus reduces the size of the ballot and automatically cancels the vote for the printed candidate.

In some States the law requires that the voter shall make a cross on the ballot adjacent the name of each candidate for whom he intends to vote. Such cross can be easily made at the same time as the holes are enlarged by providing the punching tool with a rubber stamp 3, just above the tool 2; and such stamp will print a cross mark on the ballot when the tool 2 completes the enlargement of the hole; the hole being made and stamp applied at one operation. Such cross marks are indicated at d in the drawing.

A suitable ink supply, not shown, may be provided which will supply ink to the printing surface of the marker without contracting the point of the punch.

The advantage of stamping the ballot with a cross mark or equivalent simultaneously with enlarging the holes is that in case the counting machine became inoperative the marking on the ballot can be readily determined by the eye without having to carefully scrutinize the ballot for enlargements of the holes.

In some cases as indicated in Fig. 2 instead of printing the names of the candidates on the ballots they could be indicated by numbers thereon, the names represented by such numbers of course to be conspicuously displayed in the booth so that the voter can readily enlarge the holes in the spaces containing the numbers corresponding to the names of the candidates for whom he wishes to vote. Such arrangement would enable the ballot to be materially reduced in size.

In the modification shown in Fig. 3 instead of the holes being made in distinctively marked boxes a at the ends of the spaces C, they can be made in the ends of the spaces C, or at other desirable points therein.

In each case it will be seen that all the voter has to do is to take his ballot and instead of marking in the spaces a he enlarge the holes b, opposite the names of the candidates for whom he wishes to vote, as described.

The ballots 1 may be provided with registering holes or notches 8 at desired points, by which the ballots can be alined and properly positioned in the counting machine, not shown, so that when a number of such ballots are run through such machine, they will each be properly presented beneath the detectors with which the machine is provided, in the manner well understood, and whenever the detectors find holes of the proper size in the ballot they will cause registration of votes for the candidates opposite whose names the holes appear in the ballot.

In practically utilizing my invention the ballot is prepared by making small holes in it at the points b, to be punched: so that any hole may be readily enlarged into a properly located hole; and as the ballots are made of stiff paper or cardboard it would be difficult to make such holes at other places therein.

In each case all the voter has to do is simply to force a pencil, or tool as 2, through the ballot at the small holes in the ballot opposite the names of the candidates for whom he wishes to vote, and the voter simply enlarges the small hole $b$, into a hole of the proper size opposite the name of the candidate for whom he desires to vote; such holes in the ballot will be properly located and properly sized without any further manipulation; and when such ballot is placed in the counting machine its detectors find the holes in the ballot and insure proper count of the ballot as cast for the candidates for whom the voter has voted.

What I claim is:

1. A ballot having a small hole adjacent the name of each candidate to be voted for, to enable the voter to enlarge such hole opposite the name of any candidate for whom he desires to vote into a properly located hole of desired size to cause registration of the ballot as cast for such candidate to be registered by a suitable machine, substantially as described.

2. A ballot having a small hole adjacent the name of each candidate to be voted for, so that the voter can readily make a properly located hole of the desired size opposite the name of the candidate for whom he desires to vote by pushing a pointed instrument through the hole; the small holes being so located that the holes thus made by the voter will be properly centered; said ballot also having a registering portion to enable any number of like ballots, when voted, to be counted by a proper machine.

3. A ballot provided with spaces for candidates and having the names of the candidates printed in the spaces; the spaces being of such size as to permit the name of a personal candidate to be written in a space by a voter who does not intend to vote for the candidate whose name is printed in such space, substantially as described.

4. A ballot provided with spaces for candidates and having the names of the candidates printed in the spaces; the spaces being of such size as to permit the name of a personal candidate to be written in a space by a voter who does not intend to vote for the candidate whose name is printed in such space; said ballot also having a hole locating point adjacent the name of each candidate to be voted for; so that the voter can readily make a properly located hole of the desired size opposite the name of the candidate for whom he desires to vote by pushing a pencil or like pointed instrument through the ballot at the hole locating point.

5. A ballot provided with spaces for candidates and having the names of the candidates printed in the spaces; the spaces being of such size as to permit the name of a personal candidate to be written in a space by a voter who does not intend to vote for the candidate whose name is printed in such space, said ballot having an indicated segregating point to be punched when a name is written in, thereby indicating that the ballot has been altered by the voter, substantially as described.

6. A ballot provided with spaces for candidates and having the names of the candidates printed in the spaces; the spaces being of such size as to permit the name of a personal candidate to be written in a space by a voter who does not intend to vote for the candidate whose name is printed in such space, said ballot having an indicated segregating point to be punched when a name is written in, thereby indicating that the ballot has been altered by the voter and enabling the counting machine to register the ballot as a changed ballot; said ballot also having the name of each candidate to be voted for; so that the voter can readily make a hole of the desired size opposite the name of the candidate for whom he desires to vote, so that the ballot will be properly registered on the counting machine.

7. A ballot provided with spaces for candidates and having the names of the candidates printed in the spaces; the spaces being of such size as to permit the name of a personal candidate to be written in a space by a voter who does not intend to vote for the candidate whose name is printed in such space, said ballot having an indicated segregation point to be punched when a name is written in, thereby indicating that the ballot has been altered by the voter and enabling the counting machine to register the ballot as a changed ballot; said ballot having small holes therein adjacent the names of the candidates so that the voter can readily enlarge the hole opposite the name of the candidate for whom he desires to vote by pushing a pencil or like pointed instrument through the ballot.

8. A ballot provided with spaces for candidates and having the names of the candidates printed in the spaces; with blank spaces to permit the names of a personal candidate to be written therein; said ballot having an indicated segregating point to be punched when a name is written in, thereby indicating that the ballot has been altered by the voter.

In testimony that I claim the foregoing as my own, I affix my signature.

JOHN S. BAKER.